United States Patent [19]

Damman et al.

[11] Patent Number: 5,762,360
[45] Date of Patent: Jun. 9, 1998

[54] AIR BAG ASSEMBLY

[75] Inventors: Alex Scott Damman, Clayton; Daniel Allen Rhule, West Mansfield; Mark Thomas Winters, Troy, all of Ohio

[73] Assignee: General Motors Corporation, Detroit, Mich.

[21] Appl. No.: 741,737

[22] Filed: Oct. 31, 1996

[51] Int. Cl.⁶ .................................................. B60R 21/16
[52] U.S. Cl. .......................... 280/728.2; 280/736; 280/732; 280/740
[58] Field of Search ........................ 280/728.2, 728.1, 280/731, 736, 740, 741, 732

[56] References Cited

U.S. PATENT DOCUMENTS

| | | | |
|---|---|---|---|
| 5,342,089 | 8/1994 | Fink et al. | 280/731 |
| 5,470,099 | 11/1995 | Williams | 280/728.2 |
| 5,511,818 | 4/1996 | Jarboc et al. | 280/728.2 |
| 5,553,888 | 9/1996 | Turner et al. | 280/731 |
| 5,577,763 | 11/1996 | Cuevas | 280/728.2 |

*Primary Examiner*—Christopher P. Ellis
*Attorney, Agent, or Firm*—Kathryn A. Marra

[57] ABSTRACT

An air bag assembly includes an inflator for discharging inflator gas. The inflator includes upper and lower longitudinal ends and an elongated longitudinal inflator axis. The inflator has a longitudinally elongated solid body portion and also has an outlet end portion located at the upper longitudinal end of the inflator atop the elongated solid body portion. The outlet end portion includes a plurality of discharge ports through which inflator gas is discharged. A base plate is connected to the inflator and extends radially outward therefrom. The base plate is positioned closer to the upper longitudinal end of the inflator than to the lower longitudinal end. The longitudinal inflator axis is generally perpendicular to the base plate to advantageously provide a T-shaped. An air bag is positioned above the base plate for deployment in an upwardly direction away from the base plate. This arrangement allows the outlet end portion of the inflator to distribute inflator gas evenly into the air bag and the longitudinal axis of the inflator to be oriented parallel to the direction of the inflating air bag.

15 Claims, 5 Drawing Sheets

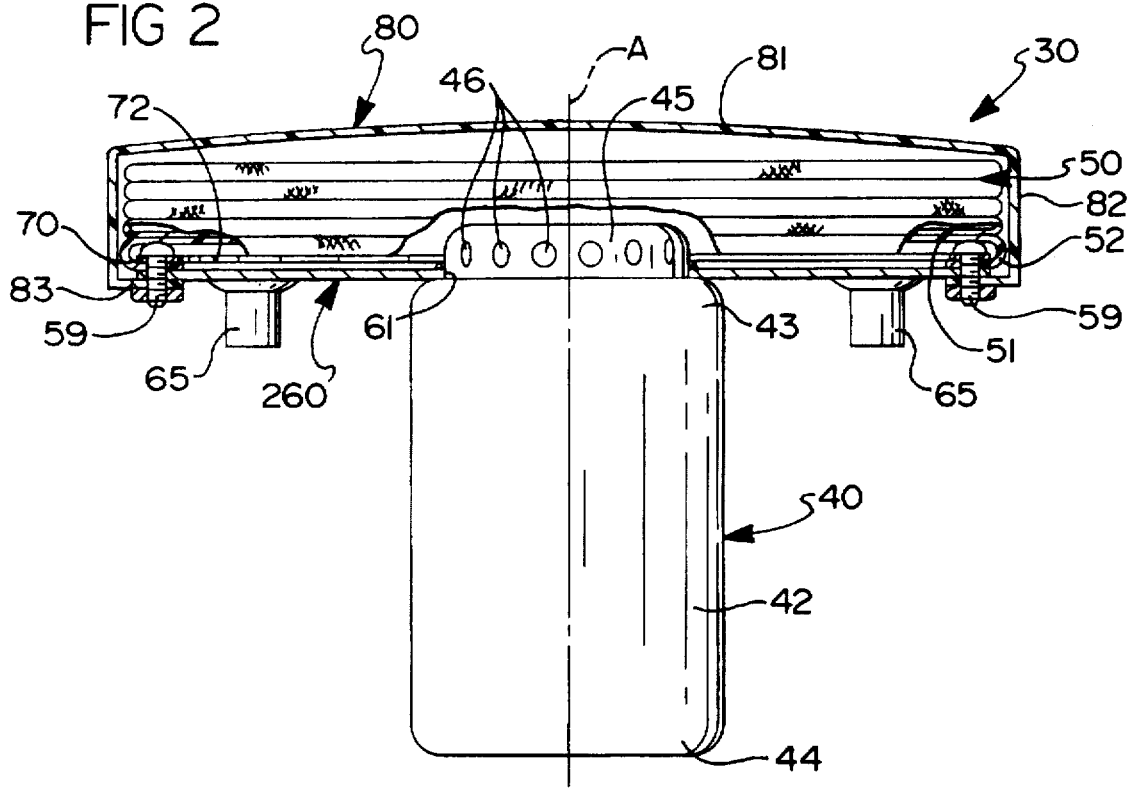
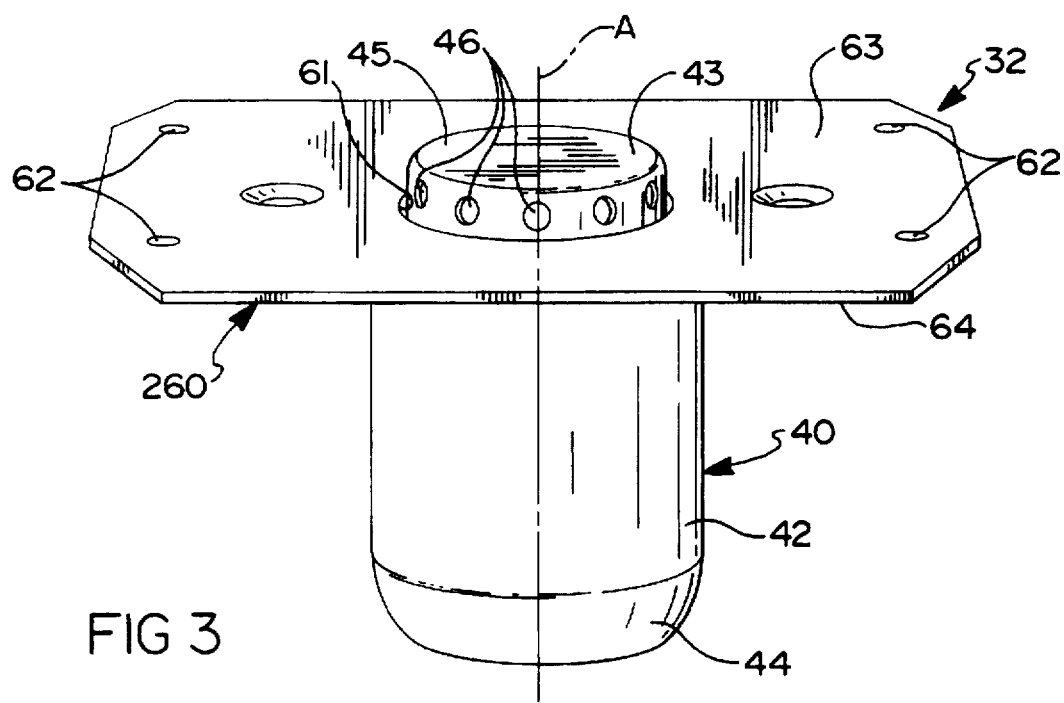

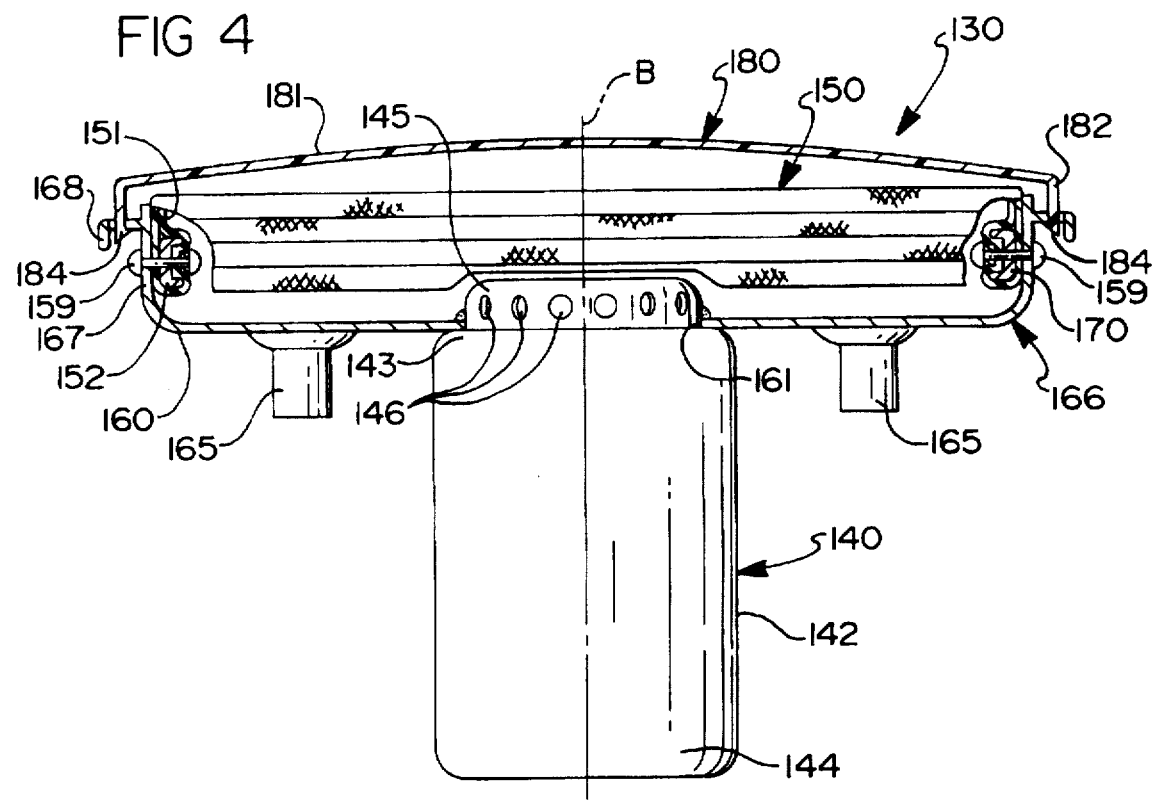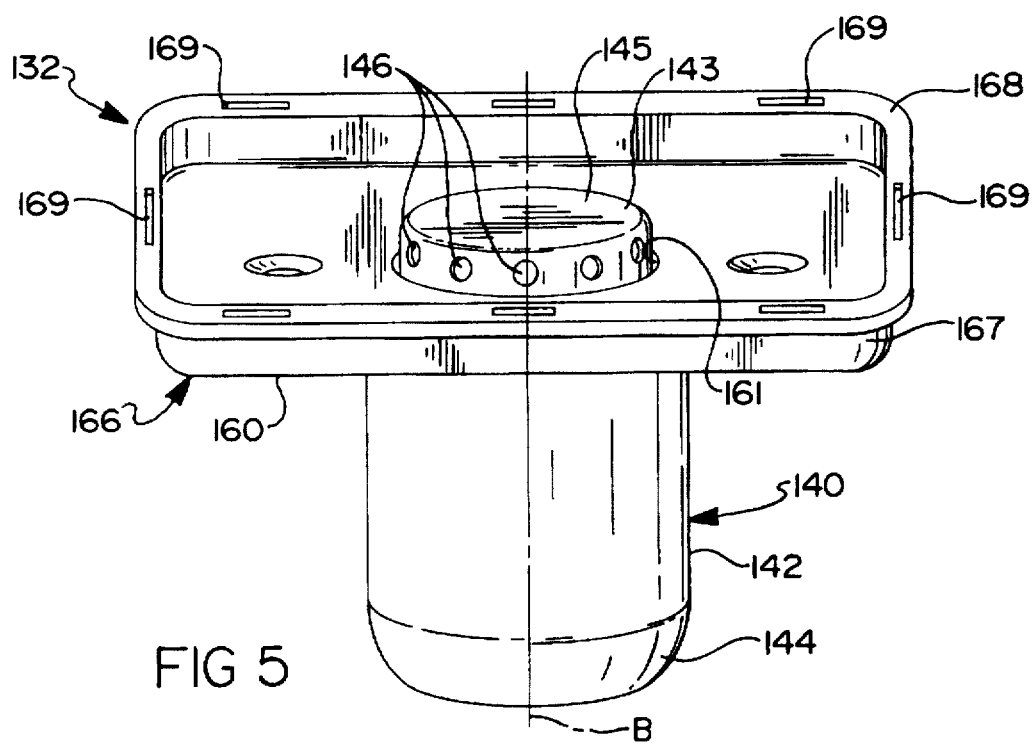

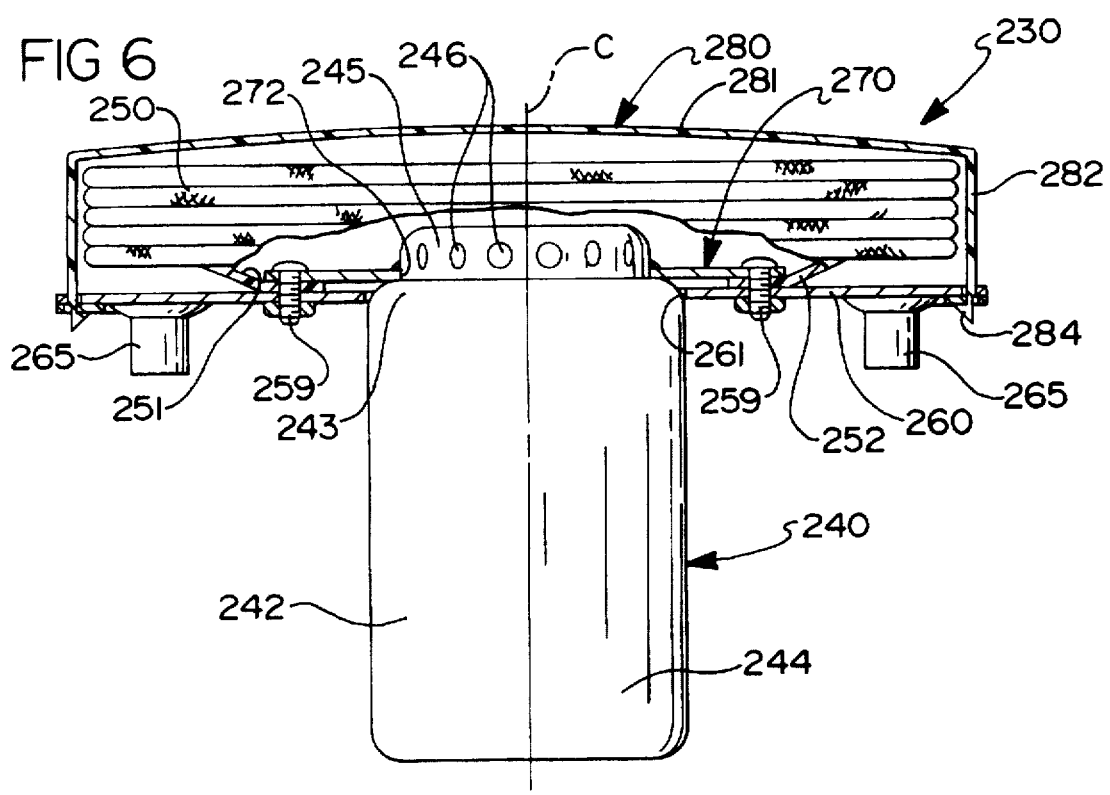
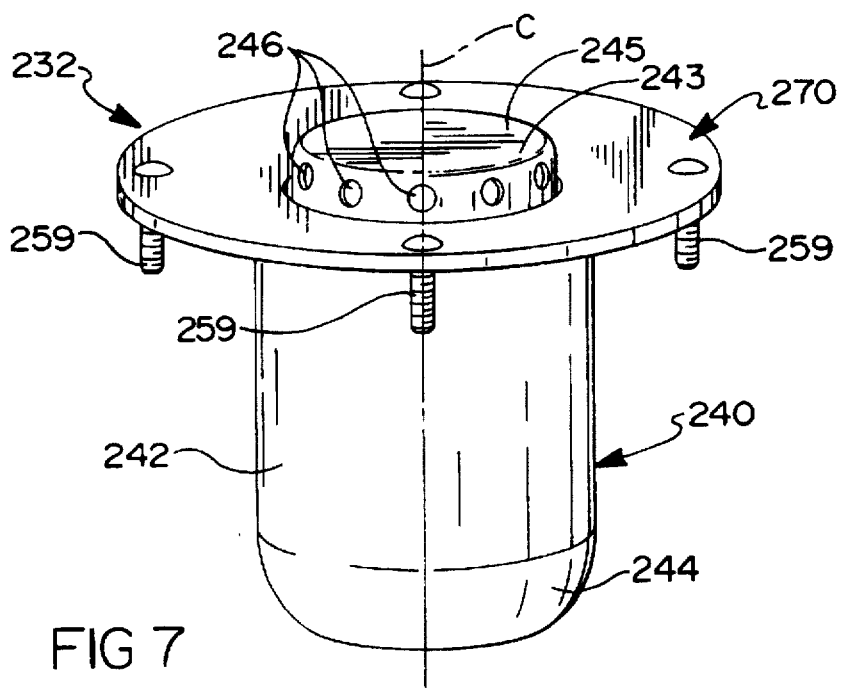

AIR BAG ASSEMBLY

TECHNICAL FIELD

This invention relates to an air bag assembly for use in a vehicle, and more particularly, to an assembly having an improved arrangement for mounting an inflator.

BACKGROUND OF THE INVENTION

It is well known in the prior art to provide an air bag assembly including an inflatable air bag for protecting the front seat passenger. The air bag assembly is typically located in a recess in the vehicle instrument panel. The air bag assembly typically includes a reaction canister and an air bag and inflator which are stored inside the reaction canister. The inflator is actuated by a signal received from a vehicle deceleration sensor to discharge inflator gas into the air bag interior. The reaction canister is sized for housing the inflator and air bag therein and has a longitudinally extending U-shaped portion, comprising a part-cylindrical bottom and longitudinally extending side walls which are closed by opposing end walls. The side walls and end walls cooperatively define a canister opening to which a mouth portion of the air bag is attached for receiving inflator gas therein.

Inflators used in passenger side air bag assemblies are generally cylindrical and longitudinally elongated and extend between the end walls of the canister. These inflators are significantly larger in size than the generally planar inflators which are used on the driver's side air bag assembly. The inflator is housed within the canister such that the walls of the canister capture the discharging gas and direct the gas upwardly into the mouth portion of the air bag.

Various types of cylindrical, longitudinally elongated inflators are used in passenger side air bag assemblies. In one, the inflator includes discharge ports located along one side of the entire longitudinal length of the inflator to direct the inflator gas upwardly into the air bag. This is known as a directed thrust inflator which has a downward resultant reaction force when actuated. The typical reaction canisters used in the prior art for passenger side air bag assemblies have been designed to accommodate this type of inflator. The inflator is typically mounted to the bottom and end walls of the canister and the longitudinal axis of the inflator is perpendicular to the direction of the discharging inflator gas. The canisters are relatively large and heavy for housing the entire inflator therein.

Another type of longitudinally elongated, cylindrical inflator has also been developed which features gas discharge ports on all or at least diametrically opposed sides of the inflator. This arrangement of the discharge ports makes the inflator thrust neutral, since the discharge forces on opposite sides of the inflator cancel with no resultant forces. These discharge ports also extend along the entire longitudinal length of the inflator. This type of inflator has opposing ends mounted to each of the end walls of the canister. The inflator is typically mounted in spaced relation to the bottom and side walls which are used to direct the discharging inflator gas upwardly through the canister opening and into the air bag. It is also known in the prior art to include a longitudinally elongated diffuser which is generally a cylinder positioned around the thrust neutral inflator for directing the discharging inflator gas upwardly into the air bag. Once again, the reaction canister and diffuser are both rather large and heavy for surrounding the longitudinal length of the inflator.

Yet another cylindrical, longitudinally elongated inflator has been developed which includes a longitudinally elongated body portion which is solid along the length of the body portion and thus does not have discharge ports along the body portion. Instead, a longitudinal end of the inflator has a reduced diameter outlet end portion including discharge ports which are spaced around the diameter of the outlet end portion and result in a thrust neutral discharge. This type of inflator is commonly known as a hybrid inflator. Hybrid inflators have become increasingly popular for use in passenger side and seat mounted air bag assemblies. The prior art also houses the entire hybrid inflator within the canister by mounting the ends of the hybrid inflator to the end walls of the canister. However, this arrangement creates the situation that the discharge ports are all located at one longitudinal end of the reaction canister such that the gas is not evenly distributed into the air bag. The prior art has suggested placing a diffuser between the air bag and the inflator to more evenly distribute the gas into the air bag. However, the diffusers are relatively large and extend across the entire length of the canister.

It will be appreciated that the prior art passenger air bag assemblies all have the shortcoming of requiring a relatively large, heavy reaction canister for holding the inflator. In addition, assemblies using the hybrid inflator also typically incorporate a diffuser for distributing the discharging inflator gas evenly into the air bag. In all of these arrangements, the longitudinal axis of the inflator is oriented perpendicular to the direction of air bag deployment such that the longitudinal ends of the inflator must each be held during air bag inflation. This arrangement typically creates the situation of uneven distribution of inflator gas into the air bag. In addition, as the size and overall length of available hybrid inflators continues to decrease, the assemblies require longitudinal extenders to connect the ends of the hybrid inflator to the reaction canister which adds weight to the air bag assembly. In addition, since the discharge ports are located at one end of the hybrid inflators, it can be awkward to mount these inflators by their ends.

SUMMARY OF THE INVENTION

Advantageously, the present invention provides an improved arrangement for mounting a longitudinally elongated hybrid inflator in an air bag assembly which advantageously utilizes the shape and structure of the hybrid inflator and eliminates the need for housing the entire inflator in the traditional relatively large and heavy reaction canister as taught in the prior art. This improved air bag assembly allows for a reduction in weight and reduction in parts over air bag assemblies of the prior art. Advantageously, the present invention eliminates the need for providing the canister and a diffuser that surrounds the entire inflator. Advantageously, the longitudinally elongated inflator is not mounted by its opposing ends and is not perpendicular to the direction of the air bag deployment. Instead, this air bag assembly is T-shaped and includes an elongated inflator which has a longitudinal axis parallel to the direction of air bag inflation and thus creates new opportunities for flexible packaging, ease of assembly, and weight reduction in the vehicle. Also advantageously, this new arrangement permits the hybrid inflator with gas discharge ports located on one end of the inflator to distribute the inflator gas evenly into the air bag without the use of a diffuser.

These advantages are accomplished in a preferred form of the invention by providing an air bag assembly for use in a vehicle. The assembly includes an inflator for discharging inflator gas. The inflator includes upper and lower longitudinal ends and an elongated longitudinal inflator axis. The inflator has a longitudinally elongated solid body portion and also has an outlet end portion located at the upper longitudinal end of the inflator atop the elongated solid body portion. The outlet end portion includes a plurality of discharge ports through which inflator gas is discharged. A base plate is connected to the inflator and extends radially outward therefrom. The base plate is positioned closer to the upper longitudinal end of the inflator than to the lower longitudinal end. The longitudinal inflator axis is generally perpendicular to the base plate to advantageously provide a T-shaped assembly in which the majority of the inflator is located below the base plate. An air bag is positioned above the base plate for deployment in an upwardly direction away from the base plate. During air bag inflation, the outlet end portion of the inflator distributes inflator gas evenly into the air bag and the longitudinal axis of the inflator is oriented parallel to the direction of the inflating air bag.

In accordance with other preferred aspects, the base plate is connected to the inflator at an intersection of the elongated solid body portion and the outlet end portion and extends radially outward therefrom such that the elongated solid body portion of the inflator extends beneath the base plate and the outlet end portion of the inflator extends above the base plate. Preferably, the outlet end portion of the inflator is centered on the base plate such that inflator gas is centrally discharged into the air bag.

Also preferably, the assembly includes a diffuser portion connected to the base plate and surrounding the outlet end portion of the inflator for diffusing the inflator gas into the air bag. The diffuser portion is positioned between the inflator and the air bag. The diffuser portion may be integrally formed with the base plate. In addition, the diffuser portion may include a stud aperture therein and the inflator may include a stud extending upwardly from the upper longitudinal end of the inflator. The stud extends through the stud aperture to connect the inflator to the base plate.

In accordance with yet another preferred aspect of the invention, the assembly may include a mounting portion extending upwardly from the base plate and surrounding the upper longitudinal end of the inflator. The mounting portion is connected to the upper longitudinal end of the inflator. Preferably, the mounting portion includes a stud aperture therein and the upper longitudinal end of the inflator includes a stud extending therefrom for insertion through the stud aperture to connect the base plate to the inflator. Preferably, the mounting portion includes a plurality of annularly spaced bent leg portions surrounding the upper longitudinal end of the inflator. The leg portions each preferably include an upwardly extending portion and a horizontally bent portion which extend inwardly and converge to provide a central portion of the mounting portion. The central portion is connected to the upper longitudinal end of the inflator. Preferably, the mounting portion surrounds the upper outlet end portion of the inflator and includes openings for diffusing inflator gas into the air bag. Thus, the mounting portion also serves as the diffuser portion while permitting an alternate structure for connecting the base plate and inflator.

Advantageously, this invention provides an air bag assembly with an improved structure for mounting a hybrid inflator. Advantageously, the assembly allows for a reduction of weight and components over air bag assemblies of the prior art. In addition, the inflator gas is evenly distributed into the air bag by taking advantage of the shape and structure of the elongated hybrid inflator having discharge ports located at one longitudinal end.

BRIEF DESCRIPTION OF THE DRAWINGS

The present invention will now be described, by way of example only, with reference to the accompanying drawings, in which:

FIG. 2 is a side view of an air bag assembly according to the present invention including an inflator and showing a cover, air bag retainer, and base plate in cross-section and showing an air bag partially-broken-away;

FIG. 3 shows a perspective view of a subassembly including the inflator and base plate of the air bag assembly of FIG. 2;

FIG. 4 is a side view of an air bag assembly according to an alternate embodiment of the present invention including an inflator and showing a cover, an air bag retainer, and a reaction canister in cross-section and showing an air bag partially-broken-away;

FIG. 5 shows a perspective view of a subassembly including the inflator and reaction canister of the air bag assembly of FIG. 4;

FIG. 6 is a side view of an air bag assembly according to another alternate embodiment of the present invention including an inflator and showing a cover, a base plate and a support plate in cross-section and showing an air bag partially-broken-away;

FIG. 7 shows a perspective view of a subassembly including the inflator and base plate of the air bag assembly of FIG. 6;

DESCRIPTION OF THE PREFERRED EMBODIMENT

Figure 1:
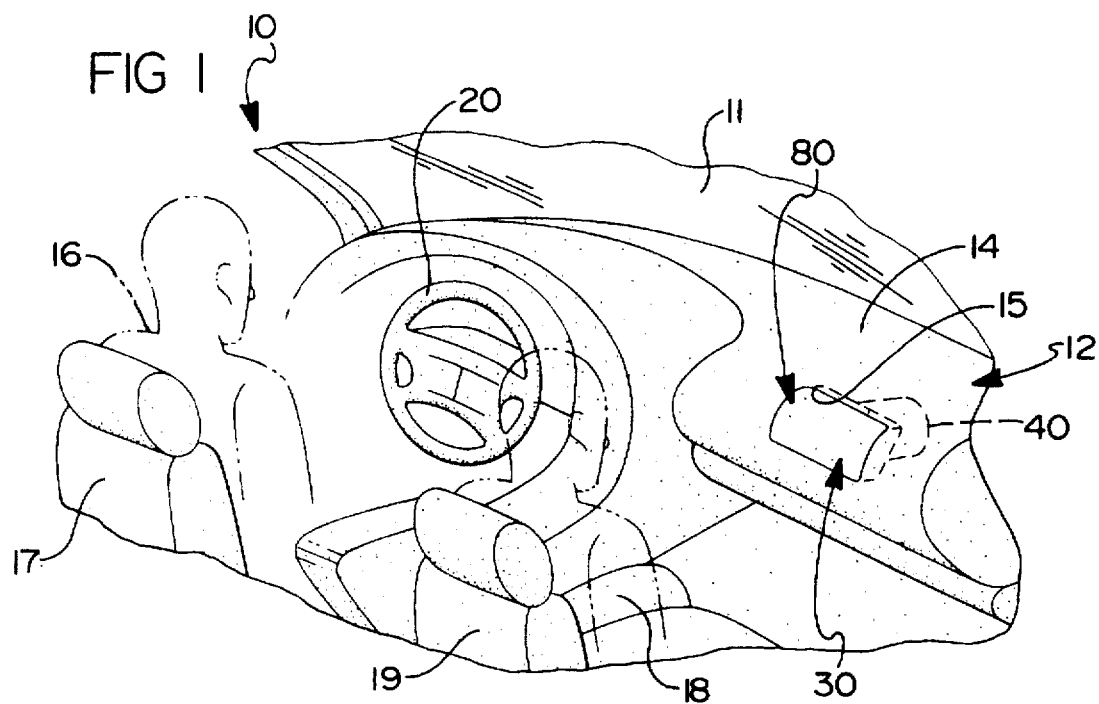
FIG. 1 is perspective view of a vehicle interior showing an air bag assembly in accordance with the present invention mounted on an instrument panel assembly located forward of a front seat passenger.

Referring to FIG. 1, it is seen that a vehicle 10 includes a windshield 11 and an instrument panel assembly 12. A driver's side occupant 16 is located in the driver's seat 17 and a vehicle passenger 18 is located in the passenger side seat 19. A vehicle steering wheel 20 includes a traditional inflatable restraint system therein (not shown). An air bag assembly 30 according to the present invention is mounted forward of the passenger 18 on the instrument panel assembly 12. The instrument panel assembly 12 includes underlying vehicle support structure (not shown). The instrument panel assembly 12 also includes an upper surface 14 including an instrument panel opening 15 for deployment of an inflatable air bag 50 therethrough, as described further hereinafter.

Referring to FIGS. 2 and 3, the component parts of the air bag assembly 30 include an inflator 40, the air bag 50, a base plate 60, an air bag retainer 70, and a cover 80. The inflator 40 generates gas for inflating the air bag 50 upon the sensing of predetermined conditions of vehicle deceleration. The inflator 40 is longitudinally elongated and cylindrical in shape. The inflator 40 includes opposing upper and lower longitudinal ends 43, 44. The inflator 40 further includes a longitudinally elongated solid body portion 42. The inflator 40 includes an outlet end portion 45 located at the upper longitudinal end 43 of the inflator 40 atop the body portion 42. The outlet end portion 45 includes a plurality of ports 46 through which the inflator gas is discharged. The outlet end portion 45 has a longitudinal length which is substantially shorter than a longitudinal length of the elongated body portion 42. The body portion 42 of the inflator 40 preferably has a diameter greater than a diameter of the outlet end portion 45 of the inflator 40. The ports 46 are circumferentially spaced around the outlet end portion 45 of the inflator 40. The inflator 40 includes a longitudinal axis A extending along the longitudinal length of the inflator 40. This type of inflator 40 is commonly known as a hybrid inflator 40.

The base plate 60 is preferably made of a sturdy material, such as metal, and is generally planar and includes an upper plate surface 63 and a lower plate surface 64. The base plate 60 includes a central plate opening 61 sized for closely receiving the outlet end portion 45 of the inflator 40 therethrough and sized smaller than the body portion 42 of the inflator 40. The base plate 60 includes a plurality of plate apertures 62 aligned for receiving fasteners 59 therethrough to connect the air bag 50 to the base plate 60, as described further hereinafter.

As best shown in FIGS. 2 and 3, the base plate 60 is connected to the inflator 40 at a location closer to the upper longitudinal end 43 of the inflator 40 than to the lower longitudinal end 44. More specifically, the base plate 60 is connected to the inflator 40 generally at the intersection of the outlet end portion 45 and the body portion 42 and extends radially outward therefrom. The inflator 40 is secured to the central plate opening 61, such as by welding or other bonding methods. Thus when the base plate 60 and inflator 40 are connected, the outlet end portion 45 of the inflator 40 extends above the upper plate surface 63 of the base plate 60 and the body portion 42 of the inflator 40 extends below the lower plate surface 64 of the base plate 60. The base plate 60 is preferably secured to the inflator 40 in sealing engagement such that inflator gas discharged from the ports 46 on the outlet end portion 45 cannot escape though the plate opening 61 and underneath the base plate 60. It will be appreciated that the outlet end portion 45 of the inflator 40 is preferably centered on the base plate 60 for centrally discharging gas into the interior of the air bag 50.

Furthermore, it will be appreciated that the longitudinal axis A of the inflator 40 extends generally perpendicular to the base plate 60 to provide a T-shaped subassembly 32 as shown in FIG. 3 and also a T-shaped air bag assembly 30 as shown in FIGS. 1 and 2. Thus advantageously, the base plate 60 is mounted to the inflator 40 towards the upper longitudinal end 43 by attachment at the intersection of the outlet end portion 45 and the body portion 42. Advantageously, the inflator 40 is attached to the base plate 60 at a single location and the opposing longitudinal ends 43, 44 of the inflator 40 do not need to each be held during inflation. Also advantageously, the outlet end portion 45 of the inflator 40 evenly and centrally distributes the inflator gas into the air bag 50, as described further hereinafter.

As best shown in FIG. 2, the air bag 50 may be of a conventional construction and material. The air bag 50 includes an air bag opening 51 for receiving inflator gas therein to inflate the air bag 50. A circumferential mouth portion 52 of the air bag 50 surrounds the air bag opening 51 and mounts the air bag 50 to the base plate 60. The mouth portion 52 and air bag opening 51 are preferably centered on the base plate 60. The air bag 50 is normally stored in a folded condition within the assembly 30 as shown in FIG. 2.

The folded air bag 50 preferably is folded to a compact shape which generally compliments the shape of the base plate 60.

An air bag retainer 70 is located within the air bag 50 around the mouth portion 52 for adding support to the mouth portion 52 of the air bag 50 during inflation. The air bag retainer 70 is preferably made of a sturdy material, such as metal, and has a shape which generally complements the shape of the mouth portion 52 of the air bag 50 and the shape of the base plate 60, preferably being a rectangular or circular shape. The air bag retainer 70 includes a retainer opening 72 aligned for receiving the outlet end portion 45 of the inflator 40 partially therethrough so that gas can be discharged into the interior of the air bag 50. As shown in FIG. 2, the air bag retainer 70 is secured to the retainer plate 60, such as by the use of fasteners 59. Thus, the fasteners 59 extend through the mouth portion 52, and the air bag 50 is trapped between the air bag retainer 70 and the base plate 60.

Referring to FIG. 1, the air bag assembly 30 may also include a cover 80 which is preferably molded from a suitable plastic material. The cover 80 includes a top portion 81 and downwardly extending side portions 82 with inwardly directed flanges 83 which are suitably anchored to the base plate 60, such as by fastening with fasteners 59. The cover 80 preferably includes tear lines or weakened portions (not shown) on the top portion 81 or sides portions 82 that allow the cover 80 to open during air bag 50 inflation. The cover 80 normally closes the instrument panel opening 15 until air bag deployment. While the cover 80 is shown as preferably attached to the base plate 60, it will be appreciated that the cover 80 need not be part of the air bag assembly 30 and instead could be hingedly connected to the upper surface 14 of the instrument panel assembly 12.

Mounting members 65 extend downwardly from the base plate 60 and can be used for securing the entire air bag assembly 30 to the support structure of the instrument panel assembly 12, such as by bolts (not shown). However, it will be appreciated that the air bag assembly 30 could also be secured to other vehicle support structure located in the seats 17, 19, or doors (not shown).

Upon actuation, the upper outlet end portion 45 of the inflator 40 discharges inflator gas through ports 46. The ports 46 of the inflator 40 direct the discharging inflator gas outwardly and upwardly by interaction with the base plate 60. The air bag 50 deploys in a generally upward direction relative the air bag assembly 30 and deploys out through the cover 80 which is opened by the force of the inflating air bag 50. During the application of forces associated with the discharge of inflator gas, the inflator 40 is securely held in position simply by attachment to the base plate 60. Advantageously, the upper plate surface 63 of the base plate 60 serves as the reaction surface for the discharging inflator gas since it is positioned beneath the ports 46 of the outlet end portion 45. It will be appreciated that the inflator 40 and base plate 60 are preferably joined in sealing engagement such that the discharging inflator gas does not leak through the central plate opening 61 in the base plate 60. This may be accomplished simply in the bonding, welding or other connection of the base plate 60 and the inflator 40. Alternately, a gasket or sealant may be applied around the plate opening 61 to prevent leakage.

Since the outlet end portion 45 is positioned above the base plate 60 and preferably centered thereon and since the mouth portion 52 of the air bag 50 is attached around the base plate 60, the inflator gas from the hybrid inflator 40 is advantageously distributed evenly and centrally into the air bag 50 without the use of a diffuser. Advantageously, this is accomplished by having the longitudinal axis A of the inflator 40 vertically oriented so that it extends parallel to the direction of the inflating air bag 50. Also advantageously, the elongated body portion 42 of the inflator 40 and thus the majority of the inflator 40 extends below the base plate 60 and is not positioned within the interior of the air bag 50. This enables the inflator gas to be evenly distributed into the air bag 50 and also enables the use of the lightweight base plate 60 instead of a relatively large and heavy reaction canister of the prior art for housing the entire inflator 40. In addition, it will be appreciated that the elongated inflator 40 no longer is held by its opposing longitudinal ends 43, 44 and no longer has a longitudinal axis A perpendicular to the direction of the inflating air bag 50. Advantageously, the outlet end portion 45 of the inflator 40 is now centered within the air bag 50 and is not positioned at one end or the other of the air bag 50 which causes uneven distribution of inflator gas into the air bag 50.

It will be appreciated that the present invention provides a T-shaped air bag assembly 30 that is lightweight and eliminates the need for a relatively heavy reaction canister in which the inflator 40 is held. The arrangement also advantageously eliminates the need for a large and relatively heavy longitudinally elongated diffuser, while still distributing the gas evenly into the air bag 50 during inflation. In addition, the T-shaped air bag assembly 30 is advantageously easier to package in the vehicle 10 in various locations. Packaging space is no longer needed for the large reaction canister as in the prior art. In addition, the T-shaped air bag assembly 30 can be easily adapted simply by changing the size and geometry of a single planar component, being the base plate 60. End extenders or adapters are no longer needed to mount the inflator 40 by its ends 43,44 or to adapt the outlet end portion 45 of the hybrid inflator 40 for connection to the vehicle 10.

It will be understood that a person skilled in the art may make modifications to the preferred embodiment shown herein within the scope and intent of the claims. It will be appreciated that the base plate 60 could be an integral portion of the instrument panel assembly 12, the seats 17, 19 or the doors to provide the T-shaped air bag assembly 30. It is only important that the longitudinal axis A of the elongated inflator is parallel to the direction of the inflating air bag 50 and that the outlet end portion 45 with discharge ports 46 is located mainly on one side of the base plate 60 and the body portion 42 without ports 46 is located on the other side of the base plate 60. It will further be appreciated that the upward and downward directions are described relative to the air bag assembly 30 itself. It will be appreciated that the air bag assembly 30 could be oriented in any direction in the vehicle 10. For example with reference to FIG. 1, the upward direction of the air bag assembly 30, is actually the rearward direction of the vehicle 10.

In addition, FIGS. 4 and 5 show an alternate embodiment of the present invention. The component parts of the air bag assembly 130 include an inflator 140, an air bag 150, a shallow reaction canister 166 including a base plate 160, an air bag retainer 170, and a cover 180. The inflator 140 generates gas for inflating the air bag 150 upon the sensing of predetermined conditions of vehicle deceleration. The inflator 140 is longitudinally elongated and cylindrical in shape. The inflator 140 includes opposing upper and lower longitudinal ends 143, 144. The inflator 140 further includes a longitudinally elongated solid body portion 142. The inflator 140 includes an outlet end portion 145 located at the upper longitudinal end 143 of the inflator 140 atop the body portion 142. The outlet end portion 145 includes a plurality of ports 146 through which the inflator gas is discharged. The inflator 140 includes a longitudinal axis B extending along the longitudinal length of the inflator 140.

The reaction canister 166 is preferably made of a sturdy material, such as metal, and is relatively shallow. The reaction canister 166 includes the generally planar base plate 160 and upwardly projecting outer edges 167. The outer edges 167 have a height which is substantially less than that of the body portion 142 of the inflator 140 and only slightly greater then the height of the outlet end portion 145 of the inflator 140. Thus, the reaction canister 166 houses the outlet end portion 145 of the inflator 140 therein, while the body portion 142 of the inflator 140 is located mainly below the reaction canister 166. The reaction canister 166 includes a central plate opening 161 sized for closely receiving the outlet end portion 145 of the inflator 140 therethrough and sized smaller than the body portion 142 of the inflator 140. The reaction canister 166 further includes an outwardly projecting lip portion 168 having apertures 169 therein for receiving tabs 184 of the cover 180 therein as described further hereinafter.

The base plate 160 of the reaction canister 166 is connected to the inflator 140 towards the upper longitudinal end 143 and generally at the intersection of the outlet end portion 145 and the body portion 142 and extends radially outward therefrom. The inflator 140 is secured to the central plate opening 161, such as by welding or other bonding methods. The base plate 160 is preferably secured to the inflator 140 in sealing engagement such that inflator gas discharged from the ports 146 on the outlet end portion 145 cannot escape through the plate opening 161 and underneath the base plate 160. It will be appreciated that the outlet end portion 145 of the inflator 140 is preferably centered on the base plate 160 for centrally discharging gas into the interior of the air bag 150. Furthermore, it will be appreciated that the longitudinal axis B of the inflator 140 extends generally perpendicular to the reaction canister 160 to provide a T-shaped subassembly 132 as shown in FIG. 5 and also a T-shaped air bag assembly 130 as shown in FIG. 4.

As shown in FIG. 4, the air bag 150 may be of a conventional construction and material. The air bag 150 includes an air bag opening 151 for receiving inflator gas therein to inflate the air bag 150. A circumferential mouth portion 152 of the air bag 150 surrounds the air bag opening 151 and mounts the air bag 150 to the upwardly projecting outer edges 167 of the reaction canister 166.

An air bag retainer 170 is located within the air bag 150 around the mouth portion 152 for adding support to the mouth portion 152 of the air bag 150 during inflation. The mouth portion 152 of the air bag 150 is wrapped around the retainer 170 and fastened to the upwardly projecting outer edges 167 of the canister 166, such as by fasteners 159.

Referring to FIG. 4, the air bag assembly 130 may also include a cover 180 which is preferably molded from a suitable plastic material. The cover 180 includes a top portion 181 and downwardly extending side portions 182 with hook-shaped tabs 184 thereon. The tabs 184 are aligned with and inserted through the apertures 169 on the lip portion 168 of the reaction canister 166 to connect the cover 180 to the reaction canister 166. However, it will be appreciated that other attachment methods are possible. In addition, mounting members 165 extend downwardly from the base plate 160 and can be used for securing the entire air bag assembly 130 to the support structure of the vehicle, such as by bolts (not shown).

Thus, it will be appreciated that the embodiment of FIGS. 4 and 5 has advantages similar to the embodiment shown in FIGS. 2 and 3, while providing an alternate to the generally planar base plate 60. Instead, a shallow and lightweight reaction canister 166 is provided simply by including upwardly projecting outer edges 167 on the base plate 160. The outer edges 167 are useful in trapping and directing the inflator gas upwardly into the air bag 150.

Upon actuation, the upper outlet end portion 145 of the inflator 140 discharges inflator gas through ports 146. The ports 146 of the inflator 140 direct the discharging inflator gas outwardly and upwardly by interaction with the base plate 160 and the upwardly projecting outer edges 167 of the reaction canister 166. The air bag 150 deploys in a generally upward direction relative the air bag assembly 130 and deploys out through the cover 180 which is opened by the force of the inflating air bag 150. During the application of forces associated with the discharge of inflator gas, the inflator 140 is securely held in position simply by attachment to the base plate 160.

Since the outlet end portion 145 is positioned above the base plate 160 and is preferably centered thereon and since the mouth portion 152 of the air bag 150 is attached around the reaction canister 166, the inflator gas from the hybrid inflator 140 is advantageously distributed evenly and centrally into the air bag 150 without the use of a diffuser. Advantageously, this is accomplished by having the longitudinal axis B of the inflator 140 vertically oriented so that it extends parallel to the direction of the inflating air bag 150. Also advantageously, the elongated body portion 142 of the inflator 140 and thus the majority of the inflator 140 is located outside of the reaction canister 166. This enables the inflator gas to be evenly distributed into the air bag 150 and also enables the use of the lightweight, shallow reaction canister 166 instead of a relatively large and heavy reaction canister of the prior art for housing the entire inflator. In addition, it will be appreciated that the elongated inflator 140 no longer is held by its opposing longitudinal ends 143, 144 and no longer has a longitudinal axis B perpendicular to the direction of the inflating air bag 150. Advantageously, the outlet end portion 145 of the inflator 140 is now centered within the air bag 150 and is not positioned at one end or the other of the air bag 150 which causes uneven distribution of inflator gas into the air bag 150. It will be appreciated that the present invention provides a T-shaped air bag assembly 130 that is lightweight and eliminates the need for a relatively heavy reaction canister in which the inflator 140 is held. Advantageously, the reaction canister 166 is small and shallow since only the outlet end portion 145 of the inflator 140 and the air bag 150 are housed therein, while the body portion 142 of the inflator 140 is located outside of the reaction canister 166.

Another alternate embodiment of the invention is shown in FIGS. 6 and 7. In this embodiment, an inflator 240 is connected to a base plate 270 which also serves as an air bag retainer and which is in turn connected to a support plate 260. The base plate 270 and the support plate 260 cooperatively provide the reaction surface for the discharging inflator gas. The component parts of the air bag assembly 230 include an inflator 240, an air bag 250, the support plate 260, the base plate 270 being the air bag retainer, and a cover 280. The inflator 240 generates gas for inflating the air bag 250 upon the sensing of predetermined conditions of vehicle deceleration. The inflator 240 is longitudinally elongated and cylindrical in shape. The inflator 240 includes opposing upper and lower longitudinal ends 243, 244. The inflator 240 further includes a longitudinally elongated solid body portion 242. The inflator 240 includes an outlet end portion 245 located at the upper longitudinal end 243 of the inflator 240 atop the body portion 242. The outlet end portion 245 includes a plurality of ports 246 through which the inflator gas is discharged. The ports 246 are circumferentially spaced around the outlet end portion 245 of the inflator 240. The inflator 240 includes a longitudinal axis C extending along the longitudinal length of the inflator 240.

As best shown in FIG. 6, the air bag 250 may be of a conventional construction and material. The air bag 250 includes an air bag opening 251 for receiving inflator gas therein to inflate the air bag 250. A circumferential mouth portion 252 of the air bag 250 surrounds the air bag opening 251 and mounts the air bag 250 to the base plate 270. The air bag 250 is normally stored in a folded condition within the assembly 230.

The base plate 270 is preferably made of a sturdy material, such as metal, and is generally planar. The base plate 270 includes a central opening 272 sized for closely receiving the outlet end portion 245 of the inflator 240 therethrough and sized smaller than the body portion 242 of the inflator 240. The base plate 270 includes a plurality of apertures for receiving fasteners 259 therethrough to connect the air bag 250 to the support plate 260. It will be appreciated that the base plate 270 serves as the air bag retainer in this embodiment.

The base plate 270 is connected to the inflator 240 towards the upper longitudinal end 243 and generally at the intersection of the outlet end portion 245 and the body portion 242 and extends radially outward therefrom. The inflator 240 is secured to the opening 272, such as by welding or other bonding methods. Thus, when the base plate 270 and inflator 240 are connected, the outlet end portion 245 of the inflator 240 extends above the base plate 270 and the body portion 242 of the inflator 240 extends below the base plate 270. The base plate 270 is secured to the inflator 240 in sealing engagement such that inflator gas discharged from the ports 246 on the outlet end portion 245 cannot escape through the opening 272 and underneath the base plate 270. It will be appreciated that the outlet end portion 245 of the inflator 240 is preferably centered on the retainer 272 for centrally discharging gas into the interior of the air bag 250. Furthermore, it will be appreciated that the longitudinal axis C of the inflator 240 extends generally perpendicular to the base plate 270 to provide a T-shaped subassembly 232 as shown in FIG. 7 and also a T-shaped air bag assembly 230 as shown FIG. 6.

The support plate 260 is preferably made of a sturdy material, such as metal, and is generally planar. The support plate 260 includes a central plate opening 261 sized for closely receiving the outlet end portion 245 of the inflator 240 therethrough and sized smaller than the body portion 242 of the inflator 240. The support plate 260 includes a plurality of apertures aligned for receiving fasteners 259 therethrough to connect the air bag 250 to the base plate 270, by trapping the air bag 250 between the base plate 270 and the support plate 260.

The support plate 260 engages directly beneath the base plate 270 and is connected to the base plate 270 by fasteners 259. The support plate 260 preferably includes a plurality of apertures thereon for receiving tabs 284 of the cover 280 therethrough to connect the cover 280 to the assembly 230.

Referring to FIG. 6, the air bag assembly 230 may also include the cover 280 which is preferably molded from a suitable plastic material. The cover 280 includes a top portion 281 and downwardly extending side portions 282 with hooked tabs 284 which are suitably anchored to apertures in the support plate 260 or alternately by traditional fasteners. The cover 280 preferably includes tear lines or weakened portions (not shown) on the top portion 281 or sides portions 282 that allow the cover 280 to open during air bag 250 inflation.

Mounting members 265 extend downwardly from the support plate 260 and can be used for securing the entire air bag assembly 230 to the support structure of the vehicle, such as by bolts (not shown).

Upon actuation, the upper outlet end portion 245 of the inflator 240 discharges inflator gas through ports 246. The ports 246 of the inflator 240 direct the discharging inflator gas outwardly and upwardly by interaction with both the base plate 270 and the support plate 260.

It will be appreciated that the support plate 260 and the base plate 270 could be combined as one integral plate such that one of the components could be eliminated. In that arrangement, the air bag 250, the inflator 240, and the cover 280 would all be connected to the single base plate 270.

Figure 8:
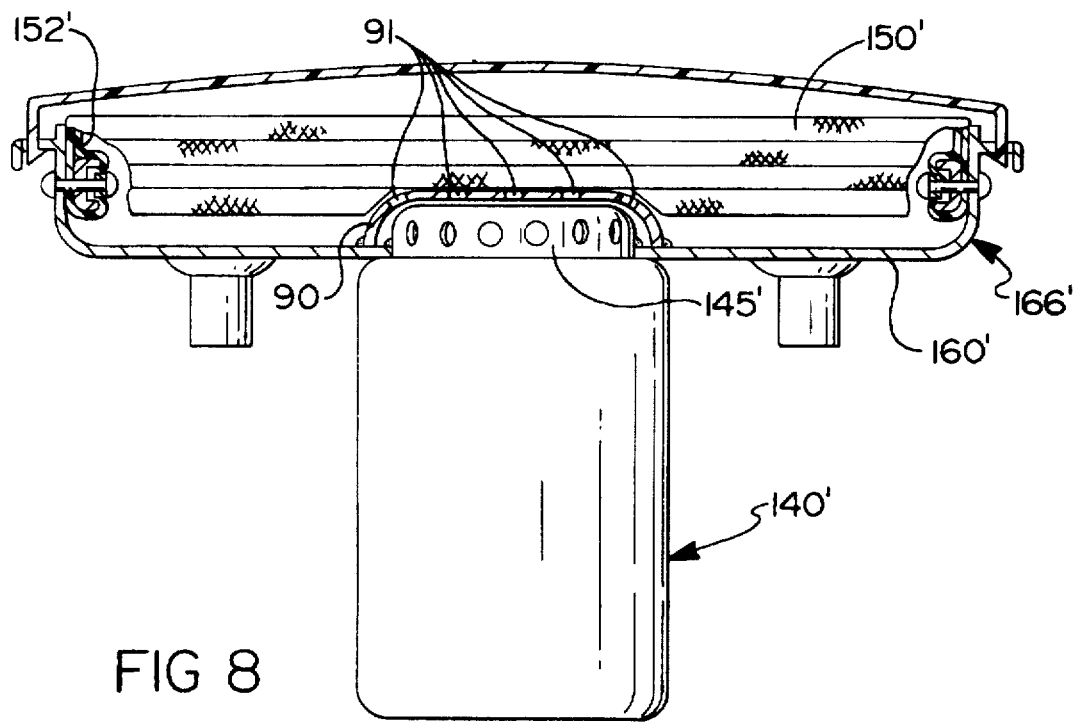
FIG. 8 is a side view of an air bag assembly according to yet another alternate embodiment of the present invention including an inflator and showing a cover, an air bag retainer, a reaction canister, and a diffuser portion in cross-section and showing an air bag partially-broken-away.

Yet another alternate embodiment of the invention is shown in FIG. 8. FIG. 8 is similar to the embodiment previously described with respect to FIGS. 4 and 5 and the same reference numerals denoted with a prime will be used for similar components. However, the embodiment of FIG. 8 has the added feature of a diffuser portion 90 connected to the base plate 160' of the reaction canister 166'. The diffuser portion 90 surrounds the outlet end portion 145' of the inflator 140' for diffusing the inflator gas into the air bag 150'. The diffuser portion 90 is positioned between the outlet end portion 145' of the inflator 140' and the air bag 150' for also serving the purpose of protecting the air bag 150' from heat associated with the discharging inflator gas during air bag inflation.

The diffuser portion 90 is much smaller than those of the prior art since it is designed to only cover the outlet end portion 145' of the inflator 140' and does not need extend along the entire length of the inflator 140' or the entire width of the reaction canister 166'. The diffuser portion 90 includes outlet holes 91 which redistribute the inflator gas in to the interior of the air bag 150'. It will be appreciated that the diffuser portion 90 is not necessary since the outlet end portion 145' is already centrally located relative the air bag 150' for even gas distribution into the air bag 150'. However the diffuser portion 90 can be used to direct the inflator gas in a more upwardly direction upon discharge and can also be used to protect the air bag 150' from heat associated with inflation. However, the air bag 150' could also include a material serving as a heat shield sewn into the mouth portion 152' of the air bag 150' for protection from inflator heat. It will further be appreciated that the diffuser portion 90 may be connected to the base plate 160' of the reaction canister 166' by welding, bonding or other mechanical fastening methods. It will also be appreciated that the diffuser portion 90 may be integrally formed with the reaction canister 166'.

Figure 9:
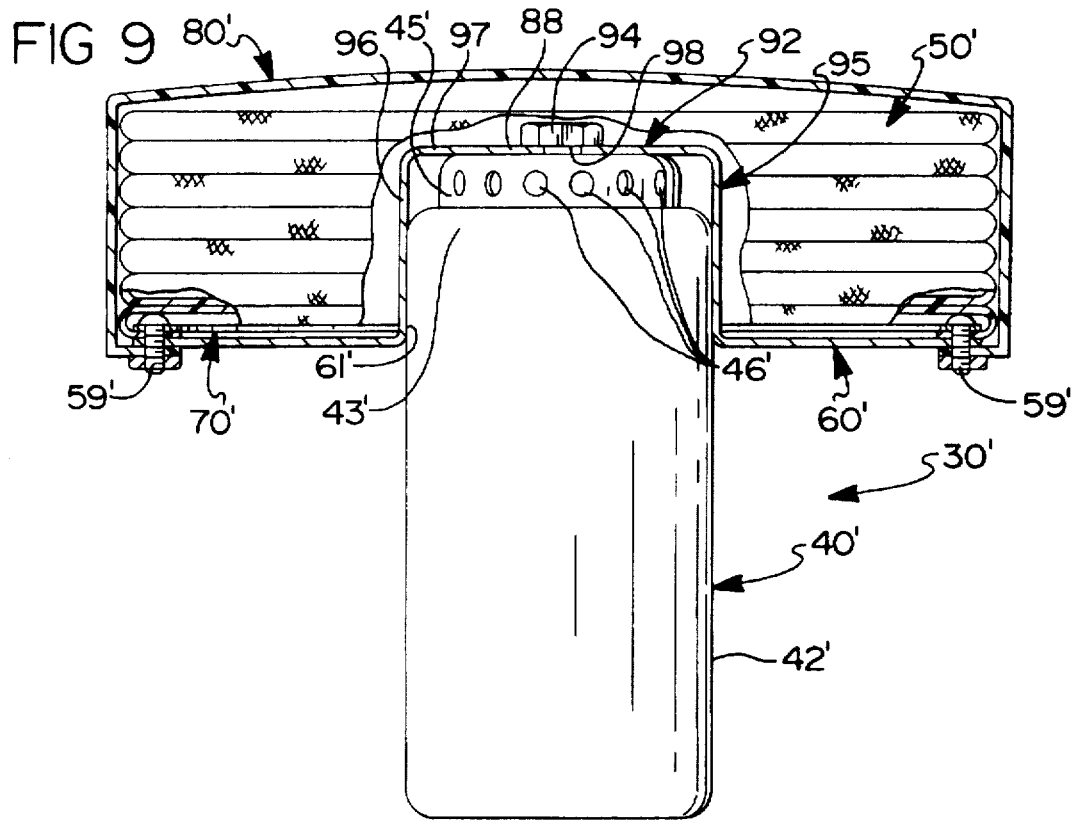
FIG. 9 is a side view of an air bag assembly according to a further alternate embodiment of the present invention including an inflator and showing a cover, a base plate and an air bag retainer in cross-section and showing an air bag partially-broken-away.
Figure 10:
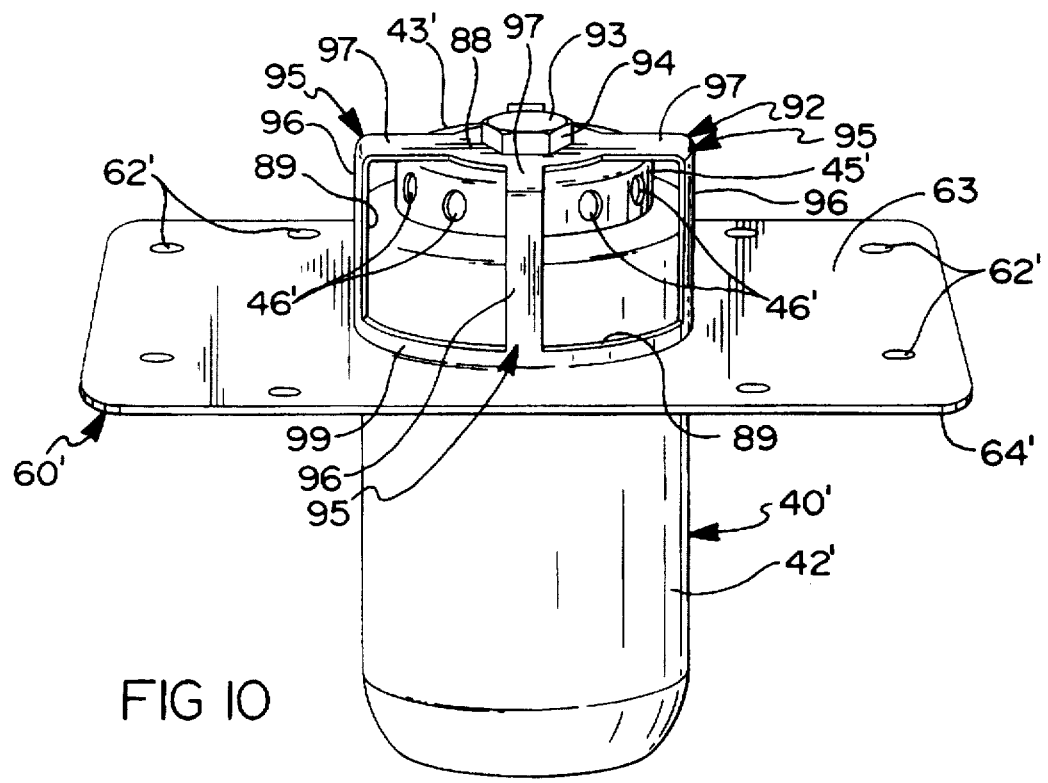
FIG. 10 shows a perspective view of a subassembly including the inflator and base plate of the air bag assembly of FIG. 9.

Yet another further alternate embodiment of the invention is shown in FIGS. 9 and 10. FIGS. 9 and 10 are similar to the embodiment previously described with respect to FIGS. 2 and 3 and the same reference numerals denoted with a prime will be used for similar components. However, in the embodiment of FIGS. 2 and 3, the base plate 60 is connected to the inflator 40 generally at the intersection of the outlet end portion 45 and the body portion 42 and is preferably connected to the inflator 40 such as by welding or other bonding. Alternately, in the embodiment of FIGS. 9 and 10, the base plate 60' has the added feature of a mounting portion 92 which preferably also serves as a diffuser and is connected to a stud 93 of the inflator 40'. This arrangement advantageously presents an alternate structure for attaching the base plate 60' to the inflator 40', as described below.

Referring to FIGS. 9 and 10, the component parts of the air bag assembly 30' include the inflator 40', an air bag 50', the base plate 60', an air bag retainer 70', and a cover 80'. The inflator 40' generates gas for inflating the air bag 50' upon the sensing of predetermined conditions of vehicle deceleration. In addition to the features described with respect to FIGS. 2 and 3, the inflator 40' includes a stud 93 which is preferably threaded for receiving a nut 94 thereon. The stud 93 extends upwardly from the upper outlet end portion 45' located at the upper longitudinal end 43' of the inflator 40'. The outlet end portion 45' includes a plurality of ports 46' through which the inflator gas is discharged.

The base plate 60' is preferably made of a sturdy material, such as metal, and is generally planar and includes an upper plate surface 63' and a lower plate surface 64'. The base plate 60' includes a central plate opening 61' sized for receiving the outlet end portion 45' of the inflator 40' therethrough and also sized for closely receiving the body portion 42' of the inflator 40' therein. The base plate 60' includes a plurality of plate apertures 62' aligned for receiving fasteners 59' therethrough to connect the air bag 50' to the base plate 60'.

The base plate 60' further includes a mounting portion 92 extending upwardly from the central plate opening 61' of the base plate 60'. The mounting portion 92 includes a plurality of annularly spaced leg portions 95 each having upwardly extending portions 96 and horizontally bent portions 97 which converge inwardly towards each other to join and form an upper central portion 88 for connection to the upper longitudinal end 43' of the inflator 40'. The leg portions 95 includes outlet holes 89 therebetween through which inflator gas may pass for discharge into the air bag 50'. It will be appreciated that the mounting portion 92 may also serve as a diffuser for diffusing inflator gas into the air bag 50' and for providing protection from inflator 40' heat to the air bag 50'. It will be appreciated that the extent of diffusion may be controlled by varying the size of the outlet holes 89 and the shape of the mounting portion 92 which could alternately be similar to the shape of the diffuser portion 90 shown in FIG. 8. It will further be appreciated that the number of leg portions 95 could also be varied.

The central portion 88 of the mounting portion 92 may be attached to the upper longitudinal end 43' of the inflator 40' in any suitable manner. Preferably, the central portion 88 includes a stud aperture 98 therein. The stud aperture 98 is sized for closely receiving the stud 93 of the inflator 40' therethrough, but is sized smaller than the upper outlet end portion 45' of the inflator 40'. The nut 94 is used to connect the mounting portion 92 to the inflator 40', as described below.

Preferably, the mounting portion 92 is integrally formed with the base plate 60', but it will be appreciated that the mounting portion 92 could also be securely attached to the base plate 60', such as by welding, bonding or fastening. Preferably, a continuous, upwardly turned lip 99 is positioned around the central plate opening 61' of the base plate 60'. The lip 99 may be useful in forming or attachment of the mounting portion 92 to the base plate 60'. In addition, the lip 99 may engage the body portion 42' of the inflator 40' to help prevent the escape of inflator gases during deployment. It will also be appreciated that a gasket or seal could be provided between the lip 99 or the central plate opening 61' and the body portion 42' of the inflator 40'. Preferably, the central plate opening 61' is sized for a slight interference fit with the body portion 42' of the inflator 40'.

As best shown in FIGS. 9 and 10, the mounting portion 92 of the base plate 60' is connected to the inflator 40' generally below the outlet end portion 45' and extends radially outward therefrom. It will be appreciated that the base plate 60' is connected to the inflator 40' at a location closer to the upper longitudinal end 43' of the inflator 40' than the lower longitudinal end 44'. To connect the base plate 60' to the inflator 40', the stud aperture 98 of the mounting portion 92 of the base plate 60' is aligned with the stud 93 on the inflator 40'. The inflator 40' is inserted between the upwardly extending portions 96 of the leg portions 95 until the stud 93 is inserted through the stud aperture 98 and the upper longitudinal end 43' of the inflator 40' engages the horizontally bent portions 97 of the leg portions 95. Then, the nut 94 is attached to the stud 93 to connect the mounting portion 92 of the base plate 60' to the inflator 40'. Advantageously, the base plate 60' and the inflator 40' are attached by a simple mechanical fastener, being the stud 93 and nut 94. It will further be appreciated that the converging horizontally bent portions 97 forming the central portion 88 could alternately be welded or otherwise bonded directly to the upper longitudinal end 43' of the inflator 40'.

It will be understood that a person skilled in the art may make further modifications to this embodiment within the scope and spirit of the claims. Although the mounting portion 92 is shown as having leg portions 95 annularly spaced about the central plate opening 61', it will be appreciated that mounting portion 92 also preferably serves as the diffuser. When the mounting portion 92 also serves as the diffuser, the mounting portion 92 may have a more solid body similar to that shown for the diffuser 90 in FIG. 8 with outlet holes 89 of various shapes for directing the gas into the air bag 50'. It will further be appreciated that the mounting portion 92 could also be added into the embodiment shown in FIGS. 4 and 5 simply by adding the mounting portion 92 to the base plate 160 and the stud 93 to the inflator 140. It will further be appreciated that the mounting portion 92 could also be added into the embodiment shown in FIGS. 6 and 7 simply by adding the mounting portion 92 to the base plate 270 and the stud 93 to the inflator 240. In any of the embodiments, the mounting portion 92 could also preferably serve as the diffuser and the diffuser may include the stud aperture 98 and the inflator include the stud 93.

It will further be appreciated that although the embodiment shown in FIGS. 9 and 10 shows the body portion 42' of the inflator 40' extending partially upward into the mounting portion 92, the mounting portion 92 could alternately have a height equal to the height of the outlet end portion 45' of the inflator 40' such that the base plate 60' extends radially outward from the intersection of the outlet end portion 45' and the body portion 42' of the inflator 40'.

It will be appreciated that the present invention provides a T-shaped air bag assembly 30' that is lightweight and eliminates the need for a relatively heavy reaction canister in which the inflator 40' is held. The arrangement also advantageously eliminates the need for a large and relatively heavy longitudinally elongated diffuser, while still distributing the gas evenly into the air bag 50' during inflation. In addition, the T-shaped air bag assembly 30' is advantageously easier to package in the vehicle in various locations. In addition, the T-shaped air bag assembly 30' can be easily adapted simply by changing the size and geometry of the base plate 60' and the mounting portion 92.

While the present invention has been described as carried out in a specific embodiment thereof, it is not intended to be limited thereby but is intended to cover the invention broadly within the scope and spirit of the appended claims.

What is claimed is:

1. An air bag assembly for use in a vehicle, the assembly comprising:

an inflator for discharging inflator gas, the inflator including upper and lower longitudinal ends and an elongated longitudinal inflator axis, the inflator having a longitudinally elongated solid body portion and having an outlet end portion located at the upper longitudinal end of the inflator atop the elongated solid body portion, the outlet end portion including a plurality of discharge ports through which inflator gas is discharged;

a base plate connected to the inflator and extending radially outward therefrom, the base plate being positioned closer to the upper longitudinal end of the inflator than to the lower longitudinal end, and the longitudinal inflator axis being generally perpendicular to the base plate to provide a T-shaped assembly;

an air bag positioned above the base plate for deployment in an upwardly direction away from the base plate;

whereby the outlet end portion of the inflator distributes inflator gas evenly into the air bag and the longitudinal axis of the inflator is oriented parallel to the direction of the inflating air bag; and a diffuser portion connected to the base plate and surrounding the outlet end portion of the inflator for diffusing the inflator gas into the air bag, the diffuser portion being positioned between the inflator and the air bag.

2. The air bag assembly of claim 1 wherein the diffuser portion is integrally formed with the base plate.

3. The air bag assembly of claim 1 wherein the diffuser portion includes a stud aperture therein and wherein the inflator includes a stud extending upwardly from the upper longitudinal end of the inflator and wherein the stud extends through the stud aperture to connect the inflator to the base plate.

4. An air bag assembly for use in a vehicle, the assembly comprising:

an inflator for discharging inflator gas, the inflator including upper and lower longitudinal ends and an elongated longitudinal inflator axis, the inflator having a longitudinally elongated solid body portion and having an outlet end portion located at the upper longitudinal end of the inflator atop the elongated solid body portion, the outlet end portion including a plurality of discharge ports through which inflator gas is discharged;

a base plate connected to the inflator and extending radially outward therefrom, the base plate being positioned closer to the upper longitudinal end of the inflator than to the lower longitudinal end, and the longitudinal inflator axis being generally perpendicular to the base plate to provide a T-shaped assembly;

an air bag positioned above the base plate for deployment in an upwardly direction away from the base plate;

whereby the outlet end portion of the inflator distributes inflator gas evenly into the air bag and the longitudinal axis of the inflator is oriented parallel to the direction of the inflating air bag; and the assembly including a mounting portion extending upwardly from the base plate and surrounding the upper longitudinal end of the inflator, the mounting portion connected to the upper longitudinal end of the inflator.

5. The air bag assembly of claim 4 wherein the mounting portion includes a stud aperture therein and wherein the upper longitudinal end of the inflator includes a stud extending therefrom for insertion through the stud aperture to connect the base plate to the inflator.

6. The air bag assembly of claim 4 wherein the mounting portion includes a plurality of annularly spaced bent leg portions surrounding the upper longitudinal end of the inflator.

7. The air bag assembly of claim 6 wherein the leg portions each include an upwardly extending portion and a horizontally bent portion which extend inwardly and converge to provide a central portion of the mounting portion, the central portion for connection to the upper longitudinal end of the inflator.

8. The air bag assembly of claim 4 wherein the mounting portion surrounds the upper outlet end portion of the inflator and includes openings for diffusing inflator gas into the air bag, the mounting portion being positioned between the inflator and the air bag.

9. The air bag assembly of claim 4 wherein the mounting portion is integrally formed with the base plate.

10. An air bag assembly for use in a vehicle comprising:

an inflator for discharging inflator gas, the inflator including upper and lower longitudinal ends and having an elongated longitudinal inflator axis, the inflator including a longitudinally elongated solid body portion and including an outlet end portion located at the upper longitudinal end of the inflator atop the elongated solid body portion, the outlet end portion including a plurality of discharge ports through which inflator gas is discharged;

a shallow reaction canister including a generally planar base plate surrounded by upwardly turned outer edges, the reaction canister having a central opening surrounding the inflator and extending radially outward therefrom, the base plate being positioned closer to the upper longitudinal end of the inflator than the lower longitudinal end such that the elongated solid body portion of the inflator extends mainly beneath the reaction canister and the outlet end portion of the inflator is located within the reaction canister and in which the longitudinal inflator axis is generally perpendicular to the base plate to provide a T-shaped air bag assembly; and a diffuser portion connected to the reaction canister and surrounding the outlet end portion of the inflator for diffusing the inflator gas into the air bag, the diffuser portion being positioned between the inflator and the air.

11. The air bag assembly of claim 10 wherein the diffuser portion includes a stud aperture therein and wherein the inflator includes a stud extending upwardly from the upper longitudinal end of the inflator and wherein the stud extends through the stud aperture to connect the inflator to the base plate.

12. An air bag assembly for use in a vehicle comprising:

an inflator for discharging inflator gas, the inflator including upper and lower longitudinal ends and having an elongated longitudinal inflator axis, the inflator including a longitudinally elongated solid body portion and including an outlet end portion located at the upper longitudinal end of the inflator atop the elongated solid body portion, the outlet end portion including a plurality of discharge ports through which inflator gas is discharged;

a shallow reaction canister including a generally planar base plate surrounded by upwardly turned outer edges, the reaction canister having a central opening surrounding the inflator and extending radially outward therefrom, the base plate being positioned closer to the upper longitudinal end of the inflator than the lower longitudinal end such that the elongated solid body portion of the inflator extends mainly beneath the reaction canister and the outlet end portion of the inflator is located within the reaction canister and in which the longitudinal inflator axis is generally perpendicular to the base plate to provide a T-shaped air bag assembly; and the assembly including a mounting portion extending upwardly and inwardly from the central opening of the base plate and surrounding the upper longitudinal end of the inflator, the mounting portion connected to the upper longitudinal end of the inflator.

13. The air bag assembly of claim 12 wherein the mounting portion includes a stud aperture therein and wherein the upper longitudinal end of the inflator includes a stud extending therefrom for insertion through the stud aperture to connect the base plate to the inflator.

14. The air bag assembly of claim 12 wherein the mounting portion includes a plurality of annularly spaced bent leg portions surrounding the upper longitudinal end of the inflator.

15. The air bag assembly of claim 12 wherein the mounting portion surrounds the upper outlet end portion of the inflator and is a diffuser including outlet openings for diffusing inflator gas into the air bag, the mounting portion being positioned between the inflator and the air bag.

* * * * *